United States Patent [19]
Shaver et al.

[11] 3,785,888
[45] Jan. 15, 1974

[54] NITROCELLULOSE GAS-GENERATING COMPOSITION CONTAINING A POLYETHYLENE GLYCOL

[75] Inventors: Robert G. Shaver, Fairfax County; Joe M. Burton, Alexandria, both of Va.

[73] Assignee: Atlantic Research Corporation, Fairfax, Va.

[22] Filed: Nov. 6, 1964

[21] Appl. No.: 410,051

Related U.S. Application Data

[63] Continuation-in-part of Ser. No. 274,055, April 18, 1963, abandoned.

[52] U.S. Cl. ............... 149/38, 149/42, 149/44, 149/76, 149/100
[51] Int. Cl. ............................................ C06b 15/00
[58] Field of Search ............... 149/18, 22, 37–44, 149/50, 65, 98, 49, 19, 60, 64, 78, 83, 96, 100

[56] References Cited
UNITED STATES PATENTS

| | | | |
|---|---|---|---|
| 3,033,716 | 5/1962 | Preckel | 149/39 X |
| 3,140,211 | 7/1964 | Berthmann et al. | 149/98 X |
| 3,265,543 | 8/1966 | Carter | 149/38 X |

*Primary Examiner*—Stephen J. Lechert, Jr.
*Attorney*—Martha L. Ross

[57] ABSTRACT

This invention relates to nitrocellulose gas-generating compositions, and more particularly to gas-generating compositions containing nitrocellulose plasticized with polyethylene glycol and/or alkoxy-terminated polyethylene glycol.

20 Claims, No Drawings

NITROCELLULOSE GAS-GENERATING COMPOSITION CONTAINING A POLYETHYLENE GLYCOL

This application is a continuation-in-part of Robert G. Shaver et al application, Ser. No. 274,055, filed April 18, 1963, now abandoned.

Nitrocellulose base gas-generating compositions are well known for uses such as rocket propulsion, but hitherto have been characterized by various undesirable ballistic and physical properties. The addition of specific ingredients and the use of new processing techniques have produced some improvement. However, the expedients heretofore used have not been entirely successful and nitrocellulose gas-generating compositions oftentimes still exhibit relatively high pressure exponents. In many cases solid nitrocellulose compositions also have insufficient tensile strength and elongation.

Accordingly, it is an object of this invention to provide nitrocellulose gas-generating compositions having improved ballistic and physical properties.

Another object of this invention is to provide nitrocellulose gas-generating compositions having reduced pressure exponents.

Another object of this invention is to provide solid nitrocellulose gas-generating compositions having improved tensile strength and elongation over a wide temperature range.

These and other objects, advantages, and features of this invention will become apparent from the following detailed description.

In accordance with our invention, we have discovered that the ballistic and physical properties of gas-generating compositions containing nitrocellulose are greatly improved by the addition of a polyethylene glycol plasticizer of a molecular weight ranging from about 200 to 600 and/or such a polyethylene glycol substituted to contain an alkoxy terminal group. The polyethylene glycol and/or alkoxy-terminated polyethylene glycol is effective with the homogeneous double base nitrocellulose gas-generating compositions which include an active plasticizer and the composite types which include nitrocellulose gas-generating compositions containing a solid oxidizer. The polyethylene glycol and/or alkoxy-terminated polyethylene glycol can be the sole plasticizer or an additional active or inactive plasticizer or a mixture of the two can be included. For our purposes an active plasticizer is one which contains combined oxygen available for oxidation of molecularly-combined components of the plasticizer and, in some cases also other ingredients in the gas-generating composition. The combined oxygen is found in groups such as nitroso, nitro, nitrite and nitrate from which it is yielded actively and readily. An inert plasticizer is one which does not contain combined oxygen available for this purpose. The more recent high performance composite type gas-generating compositions having high loadings of a solid oxidizer and in many cases containing a metal or metal hydride, particularly require improvement in ballistic parameters. The addition of the aforementioned polyethylene glycol or alkoxy-terminated polyethylene glycol produces marked reduction in the pressure exponent. The tensile strength and elongation of solid nitrocellulose gas-generating compositions also are very considerably improved over a wide range of temperatures thus permitting the use of a greater variety of these compositions at extremes of ambient temperature.

As aforementioned, the polyethylene glycol plasticizers have a molecular weight ranging from about 200 to about 600. The molecular weights of the corresponding alkoxy-terminated polyglycols are, of course, increased by the weight of terminal groups. Within this range these compounds are liquids at the composition processing temperatures which is essential for producing nitrocellulose gas-generating compositions having the desired improved ballistic and physical properties. Polyethylene glycols having a molecular weight appreciably under 200 and the corresponding alkoxy-terminated polyethylene glycols are good solvents for the nitrocellulose and therefore, cause rapid solvation and premature gelling of the nitrocellulose binder. This makes difficult the homogeneous incorporation of the necessary additional composition ingredients. Polyethylene glycols having a molecular weight much above 600 and the corresponding alkoxy-terminated polyethylene glycols are solid waxy compounds which are difficult to incorporate into the mix. The selection of a particular polyethylene glycol or alkoxy-terminated polyethylene glycol within the specified operable range of molecular weight can, of course, vary with a number of factors including the particular nitrocellulose, the additional ingredients of the compositions, the proportions of all components and the desired improved ballistic and physical properties of the gas-generating composition.

Alkoxy-terminated polyethylene glycols are less reactive than the corresponding polyethylene glycol. The use of such alkoxy-terminated polyethylene glycols, in some instances, provides increased pot-life of gas-generating composition mixes and eliminates gassing and voids in the mix. The polyethylene glycol can be alkoxy-terminated on one or both ends. Preferably the combined number of carbon atoms in the terminal groups will not exceed six. For example, alkoxy-terminated polyethylene glycols having a molecular weight of about 214 to about 685 which are terminated at one end with a methoxy, ethoxy, propoxy, butoxy, pentoxy or hexoxy group; polyethylene glycols terminated at one end with a methoxy group and at the other end with a methoxy, ethoxy, propoxy, butoxy or pentoxy group; polyethylene glycols terminated at one end with an ethoxy group and at the other end with an ethoxy, propoxy or butoxy group; and polyethylene glycols terminated at both ends with propoxy groups, are satisfactory plasticizers. The alkoxy groups having three or more carbon atoms may be of either straight chain or isomeric form. The methoxy or ethoxy terminated polyethylene glycols are particularly preferred.

Polyethylene glycols or alkoxy-terminated polyethylene glycols can be used alone or mixed together as desired.

Any desired proportion of polyethylene glycol and/or alkoxy-terminated polyethylene glycol plasticizer to nitrocellulose can be employed provided at the minimum it is sufficient to produce an appreciable improvement in the ballistic and/or the physical properties. If the gas-generating composition is to be used as a solid propellant, it is, of course, desirable not to use such excessive amounts of plasticizer in solid nitrocellulose compositions as to render them too soft for such use. Within these broad limits the proportions can vary with a number of factors among which are the properties required for a particular gas-generating composition use and the amount and kinds of additional ingredients present. The optimum proportions desired for a particular use can readily be determined by the skilled practitioner.

In general, we have found that as little as about one part by weight of polyethylene glycol and/or alkoxy-terminated poly-ethylene glycol can be added to about 10 parts by weight of nitrocellulose to effect an appreciable improvement in the properties of the final gas-generating composition. Proportions as high as about three parts by weight of polyethylene glycol and/or alkoxy-terminated polyethylene glycol to about 2 parts by weight of nitrocellulose can be used in solid gas-generating compositions. Preferably the ratio by weight of polyethylene glycol and/or alkoxy terminated polyethylene glycol to nitrocellulose varies from about 1/6 to 1/1.

The polyethylene glycol or alkoxy-terminated polyethylene glycol or mixtures thereof can be the sole plasticizer for the nitrocellulose. However, in many cases an additional plasticizer, well known to the propellant art, either active, such as nitroglycerin, trimethylolethane-trinitrate, pentaerithritol trinitrate, butane triol trinitrate, diethylene glycol dinitrate and the like, or inert, such as dibutyl succinate, dibutyl adipate, triacetin, ethyl diphenyl phosphate, tributyl phosphate and the like, can be present. Where polyethylene glycol and/or alkoxy-terminated polyethylene glycol are used as the only plasticizer or with additional other inert plasticizer, a solid finely-divided oxidizer is necessary to obtain good ballistic properties. Any suitable conventional solid oxidizing agent which yields oxygen actively and readily such as ammonium, sodium and potassium perchlorates, ammonium, sodium, potassium and barium nitrates, metal peroxides, e.g., barium peroxide, hydrazine nitroform and the like can be employed. For reasons of stability, the inorganic oxidizers are preferable. However, organic oxidizers, such as hexanitroethane, mannitol hexanitrate, cyclotrimethylene tri-nitramine and the like can also be used. Generally, good ballistic properties are also obtainable where an active plasticizer is present along with the polyethylene glycol and/or alkoxy-terminated polyethylene glycol or mixture of polyethylene glycol and/or terminated polyethylene glycol and other inert plasticizer. To obtain maximum ballistic performance from the more recent composite type of nitrocellulose gas-generating compositions, particularly those in which finely-divided solid high-energy fuels such as metals, e.g., boron, lithium, beryllium, magnesium, aluminum, calcium, and the like, and metal hydrides, e.g., beryllium hydride, lithium hydride, lithium-aluminum hydride, aluminum hydride and the like are present, a solid oxidizer is employed.

The gas-generating compositions can also contain additional conventional ingredients, of which the following are exemplary only; burning rate catalysts such as copper chromite and iron oxide, stabilizers such as ethyl centralite and 2-nitrodiphenylamine and coolants such as ammonium oxalate.

The amounts of the aforementioned conventional ingredients can be varied over a wide range depending upon the desired properties of the final compositions. Generally, the solid additives of the composite compositions such as oxidizers, metals and metal hydrides can be present in amounts up to about 90 percent by weight of the total compositions. Above this the compositions have such inferior physical properties as to be unsuitable for some uses such as, for example, propellant use. The optimum proportions of these and the other aforementioned well-known components are easily ascertained by routine experimentation of the skilled technician.

Any suitable method can be employed in making the gas-generating compositions of our invention. The ingredients can be mixed together in any sequence using well-known processing techniques to control the consistency, homogeneity, etc., of the mixture. For example, first the nitrocellulose can be mixed with the polyethylene glycol and/or alkoxy-terminated polyethylene and any additional plasticizers which are present. Other ingredients such as stabilizers, oxidizers, fuels, etc., then can be added and the resulting composition mixed until homogeneous. It can then be formed into a shaped charge of any desired configuration by any well-known procedure such as molding, casting, extrusion, etc.

The following specific examples are presented to illustrate the improved ballistic and physical properties imparted to typical nitrocellulose gas-generating formulations by the addition of our polyethylene glycols and/or alkoxy-terminated polyethylene glycols but it will be understood, are in no way limiting.

EXAMPLE 1

A gas-generating composition having the following composition by weight was fabricated by first mixing the ingredients in a sigma blade mixer until they were substantially homogeneous. The mixture was then molded to form a solid gas-generating product.

| COMPOSITION FORMULATION | PER CENT BY WEIGHT OF TOTAL COMPOSITION |
|---|---|
| Nitrocellulose (12.5%N) | 19.0 |
| Trimethylolethanetrinitrate | 20.5 |
| Polyethylene glycol (mol. wt. 400) | 8.5 |
| Resorcinol | 1.0 |
| Ethyl centralite | 1.0 |
| Aluminum (Alcoa 123) | 15.0 |
| Ammonium perchlorate | 35.0 |

A second composition was fabricated by the same process using identical proportions and ingredients except that dibutyl phthalate was substituted for the polyethylene glycol.

The physical and ballistic properties of these two solid compositions are compared in Tables I and IA.

TABLE I

| Plasticizer | Pressure Exponent (1000 psi) | Tensile Strength (psi) | | | Ultimate Elongation (percent) | | | Brittle Point (°C) |
|---|---|---|---|---|---|---|---|---|
| | | −40°F | −70°F | +140°F | −40°F | +70°F | +140°F | |
| Polyethylene glycol | 0.58 | 2350 | 90 | 130 | 7 | 210 | 230 | −1 |
| Dibutyl phthalate | 0.66 | 1420 | 80 | 75 | 6 | 80 | 60 | +5 |

TABLE IA
Burning Rates in in/sec.

| Chamber Pressure (psi) | 200 | 300 | 460 | 650 | 850 | 1100 | 1400 | 1700 | 2000 |
|---|---|---|---|---|---|---|---|---|---|
| Plasticizer | | | | | | | | | |
| Polyethylene glycol | 0.20 | 0.26 | 0.32 | 0.37 | 0.46 | 0.52 | 0.60 | 0.67 | 0.75 |
| Dibutyl phthalate | 0.15 | 0.19 | 0.23 | 0.31 | 0.37 | 0.44 | 0.53 | 0.59 | 0.64 |

The use of polyethylene glycol resulted in a reduced pressure exponent and an increased burning rate over a wide range of pressures.

EXAMPLE 2

A solid gas-generating composition having the following ingredients and proportions was fabricated using the process of Example 1.

| COMPOSITION FORMULATION | PERCENT BY WEIGHT OF TOTAL COMPOSITION |
|---|---|
| Nitrocellulose (12.6% N) | 19.0 |
| Trimethylolethanitrinitrate | 26.0 |
| Polyethylene glycol (Mol. wt. 200) | 3.0 |
| Resorcinol | 1.0 |
| Ethyl centralite | 1.0 |
| Aluminum (Alcoa 123) | 15.0 |
| Ammonium perchlorate | 35.0 |

Additional solid compositions were fabricated in which other plasticizers were substituted for the polyethylene glycol having a molecular weight of 200. The brittle point of each solid composition as determined by standard A.S.T.&M. Procedure No. D-746-52T is set forth in Table II.

TABLE II

| PLASTICIZER | BRITTLE POINT (°C) |
|---|---|
| Polyethylene glycol (Mol. wt. 200) | +1 |
| Polyethylene glycol (Mol. wt. 400) | +3 |
| Dibutyl phthalate | +11 |
| Dibutyl sebacate | +13 |
| Polypropylene glycol | +13 |

EXAMPLE 3

A solid gas-generating composition having the following composition was made by first mixing the ingredients in a standard mixer for 1 ½ hours followed by de-aeration for three hours and final curing at 80°C for two hours.

| COMPOSITION FORMULATION | PERCENT BY WEIGHT OF TOTAL COMPOSITION |
|---|---|
| Nitrocellulose (12.6% N) | 46.8 |
| Nitroglycerin | 4.2 |
| 2-nitrodiphenylamine | 0.8 |
| Carbon black | 0.2 |
| Polyethylene glycol (mol. wt. 200) | 48.0 |

This composition, which was designed to be a relatively low-impulse formulation generating gases at a relatively low temperature, had the following good ballistic and physical properties:

| Burning rate (1000 psi) | 0.068 in/sec |
|---|---|
| Pressure exponent (1000 psi) | 0.44 |
| Ultimate stress | 97.9 psi |
| Ultimate strain | 190% |
| Young's modulus | 897 psi |

EXAMPLE 4

A solid gas-generating composition having the following composition was prepared.

| COMPOSITION FORMULATION | PERCENT BY WEIGHT OF TOTAL COMPOSITION |
|---|---|
| Nitrocellulose (12.6% N) | 16.60 |
| Nitroglycerin | 0.60 |
| Trimethylolethanitrinitrate | 27.60 |
| Mono-methoxy polyethylene glycol (mol. wt. 350) | 3.30 |
| Resorcinol | 1.00 |
| 2-Nitrodiphenylamine | 0.90 |
| Cyclotetramethylene tetranitramine | 26.20 |
| Beryllium | 11.50 |
| Ammonium perchlorate | 12.30 |

The composition had the following ballistic and physical properties:

| Burning rate (1000 psi) | 0.29 in/sec |
|---|---|
| Pressure Exponent (1000 psi) | 0.51 |
| Ultimate stress | 130 psi |
| Young's modulus | 400 psi |

As will be apparent to those skilled in the art, various other modifications can be carried out from the above disclosure without departing from the spirit and scope of the invention embodied within the claims.

We claim:

1. In a nitrocellulose gas-generating composition having at least one compound which yields oxygen actively and readily selected from the group consisting of active plasticizers, solid finely-divided oxidizers and mixtures thereof, the improvement which comprises the addition of a plasticizer component selected from the group consisting of polyethylene glycol having a molecular weight of about 200 to about 600; said polyethylene glycol substituted to contain at least one terminal alkoxy group, wherein the combined number of carbon atoms in the terminal alkoxy groups is not more than 6; and mixtures thereof, the minimum ratio by weight of said plasticizer component to said nitrocellulose being about 1/10.

2. The gas-generating composition of claim 1 which additionally contains a fuel selected from the group consisting of metals and metal hydrides.

3. The gas-generating composition of claim 1 wherein said alkoxy group is a methoxy group.

4. The gas-generating composition of claim 3 which additionally contains a fuel selected from the group consisting of metals and metal hydrides.

5. In a nitrocellulose gas-generating composition having at least one compound which yields oxygen actively and readily selected from the group consisting of active plasticizers, solid finely-divided oxidizers and mixtures thereof, the improvement which comprises the addition of an alkoxy-terminated polyethylene glycol having a molecular weight of about 214 to about 685, the combined number of carbon atoms in the terminal alkoxy groups being not more than 6, the minimum ratio by weight of said alkoxy-terminated polyethylene glycol to said nitrocellulose being about 1/10.

6. The gas-generating composition of claim 5 which additionally contains a fuel selected from the group consisting of metals and metal hydrides.

7. In a nitrocellulose gas-generating composition having at least one compound which yields oxygen actively and readily selected from the group consisting of active plasticizers, solid finely-divided oxidizers and mixtures thereof, the improvement which comprises the addition of a methoxy-terminated polyethylene glycol having a molecular weight of about 214 to about 628, the minimum ratio by weight of said methoxy-terminated polyethylene glycol to said nitrocellulose being about 1/10.

8. The gas-generating composition of claim 7 which additionally contains a fuel selected from the group consisting of metals and metal hydrides.

9. In a nitrocellulose gas-generating composition having at least one compound which yields oxygen actively and readily selected from the group consisting of active plasticizers, solid finely-divided oxidizers and mixtures thereof, the improvement which comprises the addition of polyethylene glycol having a molecular weight of about 200 to about 600, the minimum ratio by weight of said polyethylene glycol to said nitrocellulose being about 1/10.

10. The nitrocellulose gas-generating composition of claim 9 which additionally contains an inert plasticizer.

11. The nitrocellulose gas-generating composition of claim 9 in which said compound is an active plasticizer.

12. The nitrocellulose gas-generating composition of claim 11 which additionally contains an inert plasticizer.

13. The nitrocellulose gas-generating composition of claim 9 in which said compound is a solid, finely-divided oxidizer.

14. The nitrocellulose gas-generating composition of claim 13 which additionally contains an inert plasticizer.

15. The nitrocellulose gas-generating composition of claim 9 which contains a mixture of an active plasticizer and a solid, finely-divided oxidizer.

16. The nitrocellulose gas-generating composition of claim 15 which additionally contains an inert plasticizer.

17. The nitrocellulose gas-generating composition of claim 13 which additionally contains a fuel selected from the group consisting of metals and metal hydrides.

18. The nitrocellulose gas-generating composition of claim 17 in which the fuel is a metal.

19. The nitrocellulose gas-generating composition of claim 15 which additionally contains a fuel selected from the group consisting of metals and metal hydrides.

20. The nitrocellulose gas-generating composition of claim 1 wherein said nitrocellulose gas-generating composition is a shaped nitrocellulose propellant grain.

* * * * *